United States Patent
Savage et al.

(10) Patent No.: US 10,354,018 B2
(45) Date of Patent: Jul. 16, 2019

(54) GENERATING TUBES WITHIN THREE-DIMENSIONAL MODELS

(71) Applicant: AUTODESK, INC., San Rafael, CA (US)

(72) Inventors: Valkyrie Savage, Berkeley, CA (US); Tovi Grossman, Toronto (CA); George Fitzmaurice, Toronto (CA); Björn Hartmann, San Francisco, CA (US); Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 390 days.

(21) Appl. No.: 14/744,981

(22) Filed: Jun. 19, 2015

(65) Prior Publication Data

US 2015/0370926 A1 Dec. 24, 2015

Related U.S. Application Data

(60) Provisional application No. 62/014,881, filed on Jun. 20, 2014.

(51) Int. Cl.
*G06F 17/50* (2006.01)
*G06T 19/20* (2011.01)

(52) U.S. Cl.
CPC .............. *G06F 17/50* (2013.01); *G06T 19/20* (2013.01); *G06F 2217/34* (2013.01)

(58) Field of Classification Search
CPC ...... G06F 17/50; G06F 2217/34; G06T 19/20
See application file for complete search history.

(56) References Cited

U.S. PATENT DOCUMENTS 6,781,582 B1 * 8/2004 Van Rens ............... G06T 17/20
345/420
2017/0100898 A1 * 4/2017 Cofler ................. B29C 67/0092

OTHER PUBLICATIONS

Ekoed, "Maya: Cutting a hole in an object via the booleans / difference command", posted on Jan. 21, 2009. pp. 1. https://www.youtube.com/watch?v=nc50WFjyynQ.*
Erick Mendez, "Generating Semantic 3D Models of Underground Infrastructure", IEEE Computer Graphics and Applications, Jun. 2008. pp. 24-33.*
Bickel, B., Bacher, M., Otaduy, M. A., Lee, H. R., Pfister, H., Gross, M., and Matusik, W. Design and fabrication of materials with desired deformation behavior. In SIGGRAPH 2010, 63:1-63:10.
Bosch, R., and Herman, A. Continuous line drawings via the traveling salesman problem. Oper. Res. Lett. 32,4 (Jul. 2004), 302-303.

(Continued)

*Primary Examiner* — Chong Wu
(74) *Attorney, Agent, or Firm* — Artegis Law Group, LLP

(57) ABSTRACT

One embodiment of the present invention sets forth a technique for generating a tube within a three-dimensional (3D) model. The technique involves receiving a first location on a surface of the 3D model. The technique further involves receiving a second location on the surface of the 3D model. The technique further involves receiving at least one constraint associated with a first tube to be generated within the 3D model. The technique further involves generating, based on the at least one constraint, the first tube, where the first tube connects a first opening at the first location with to a second opening at the second location.

20 Claims, 10 Drawing Sheets

(56) References Cited

OTHER PUBLICATIONS

Follmer, S., Leithinger, D., Olwal, A., Cheng, N., and Ishii, H. Jamming user interfaces: Programmable particle stiffness and sensing for malleable and shape-changing devices. In Proc. UIST '12, 519-528.
Harrison, C., Xiao, R., and Hudson, S. Acoustic barcodes: Passive, durable and inexpensive notched identification tags. In Proc. UIST '12, 563-568.
Hart, P., Nilsson, N., and Raphael, B. A formal basis for the heuristic determination of minimum cost paths. IEEE Transactions on Systems Science and Cybernetics 4,3 (Jul. 1968), 100-107.
Lorensen, W. E., and Cline, H. E. Marching cubes: A high resolution 3D surface construction algorithm. Computer Graphics 21, 4 (Jul. 1987).
Majidi, C., Kramer, R., and Wood, R. J. A non-differential elastomer curvature sensor for softer-than-skin electronics. Smart Materials and Structures 20 (2011).
Muller, M., Heidelberger, B., Hennix, M., and Ratcliff, J. Position based dynamics. J. Vis. Comun. Image Represent. 18, 2 (Apr. 2007), 109-118.
Muller, S. Lopes, P., Kaefer, K., Kruck, B., and Baudisch, P. Constructable: Interactive construction of functional mechanical devices. In CHI '13 EA, 3107-3110.
Museth, K., Breen, D. E., Whitaker, R. T., Mauch, S., and Johnson, D. Algorithms for interactive editing of level set models. Comp. Graph. Forum 24, 4 (2005), 821-841.
Navarrete, M., Lopes, A., Acuna, J., Estrada, R., MacDonald, E., Palmer, J., and Wicker, R. Integrated layered manufacturing of a novel wireless motion sensor system with GPS. Technical Report (2007).
Ono, M., Shizuki, B., and Tanaka, J. Touch & activate: Adding interactivity to existing objects using active acoustic sensing. In Proc. UIST '13, 31-40.
Park, Y.-L., Chen, B.-R., and Wood, R. J. Design and fabrication of soft articial skin using embedded microchannels and liquid conductors. IEEE Sensors Journal 12, 8 (Aug. 2012), 2711-2718.
Prevost, R., Whiting, E., Lefebvre, S., and Sorkine-Hornung, O. Make it stand: Balancing shapes or 3D fabrication. ACM Trans. Graph. 32, 4 (Jul. 2013), 81:1-81:10. 16.
Rivers, A., Moyer, I. E., and Durand, F. Position-correcting tools for 2d digital fabrication. ACM Transactions on Graphics (TOG) 31, 4 (2012), 88.
Sarik, J., Butler, A., Villar, N., Scott, J., and Hodges, S. Combining 3D printing and printable electronics. In Adj. Proc. TEI 2012.
Sato, M., Poupyrev, I., and Harrison, C. Touch'e: Enhancing touch interaction on humans, screens, liquids, and everyday objects. In Proc. CHI '12, 483492.
Savage, V., Chang, C., and Hartmann, B. Sauron: Embedded single-camera sensing of printed physical user interfaces. In Proc. UIST '13, 447456.
Savage, V., Zhang, X., and Hartmann, B. Midas: Fabricating custom capacitive touch sensors to prototype interactive objects. In Proc. UIST '12, 579588.
Schmidt, R., and Singh, K. Meshmixer: An interface for rapid mesh composition. In Acm Siggraph 2010 Talks, 6:1-6:1.
Sells, E. Rapid prototyped electronic circuits. http://fennetic.net/irc/reprap_circuits.pdf, 2004.
Slyper, R., and Hodgins, J. Prototyping robot appearance, movement, and interactions using flexible 3D printing and air pressure sensors. IEEE Xplore (2012).
Weichel, C., Lau, M., Kim, D., Villar, N., and Gellersen, H. Mixfab: A mixed-reality environment for personal fabrication. In Proc. CHI '14, ACM (2014), To appear.
Wills, K., Brockmeyer, E., Hudson, S., and Poupyrev, I. Printed optics: 3D printing of embedded optical elements for Interactive devices. In Proc. UIST '12, 589598.
Wills, K. D., Xu, C., Wu, K.-J., Levin, G., and Gross, M. D. Interactive fabrication: New interfaces for digital fabrication. In Proc. TEI '11, 69-72.
Mills, K. D. D., and Wilson, A. D. InfraStructs: fabricating information inside physical objects for imaging in the terahertz region. ACM Trans. Graph. 32, 4, 138:1138:10.
Wimmer, R. FlyEye: Grasp-sensitive surfaces using optical fiber. In Proc. TEI '10, 245-248.
Wong, F. J., and Takahashi, S. A graph-based approach to continuous line illustrations with variable levels of detail. Computer Graphics Forum 30, 7 (Nov. 2011), 1931-1939.
Yao, L., Niiyama, R., Ou, J., Follmer, S., Della Silva, C., and Ishii, H. PneUI: pneumatically actuated soft composite materials for shape changing interfaces. In Proc. UIST '13, 1322.
Zoran, A. The 3D printed flute: Digital fabrication and design of musical instruments. Journal of New Music Research 40, 4 (Dec. 2011), 379-387.
Zoran, A. and Paradiso, J. A. FreeD: a freehand digital sculpting tool. In Proceedings of the SIGCHI Conference on Human Factors in Computing Systems, ACM (2013), 2613-2616.
Route inspection problem, https://en.wikipedia.org/wiki/Route_inspection_problem, 3 pages.
Eulerian path, https://en.wikipedia.org/wiki/Eulerian_path#Fleury. 27s_algorithm, 6 pages.

\* cited by examiner

| CONSTRAINTS 128 | |
|---|---|
| TUBE RADIUS | 10 mm |
| MINIMUM DISTANCE FROM SIDE OF TUBE TO SURFACE | 30 mm |
| MINIMUM DISTANCE TO ANOTHER TUBE | 20 mm |
| MINIMUM ANGLE BETWEEN TUBE PATH AND SURFACE PLANE AT EACH OPENING | 85° |

FIG. 2

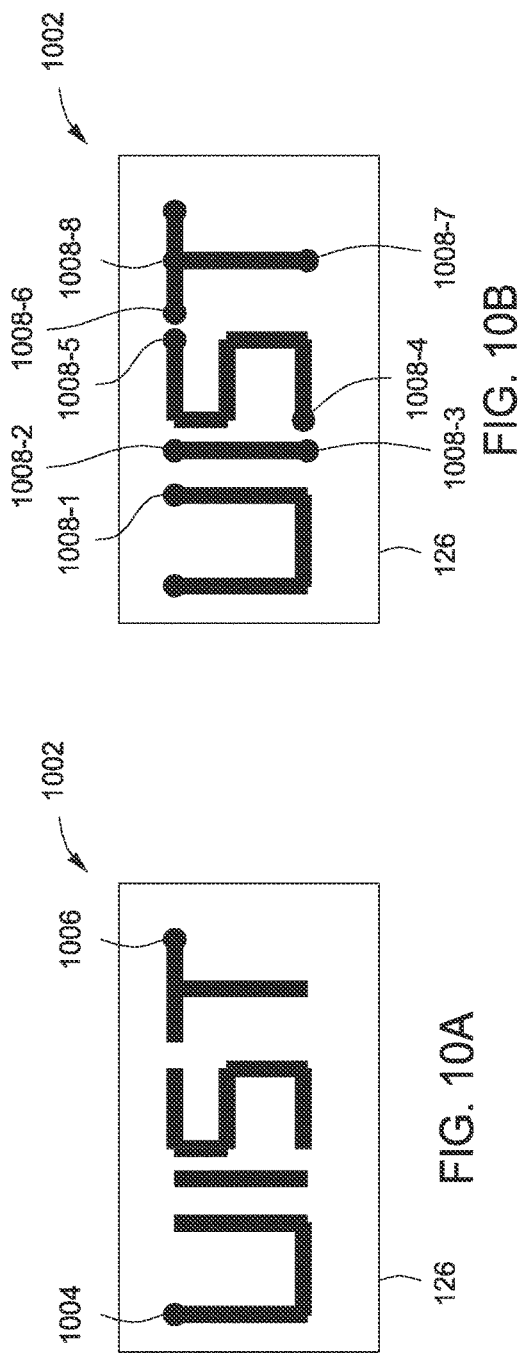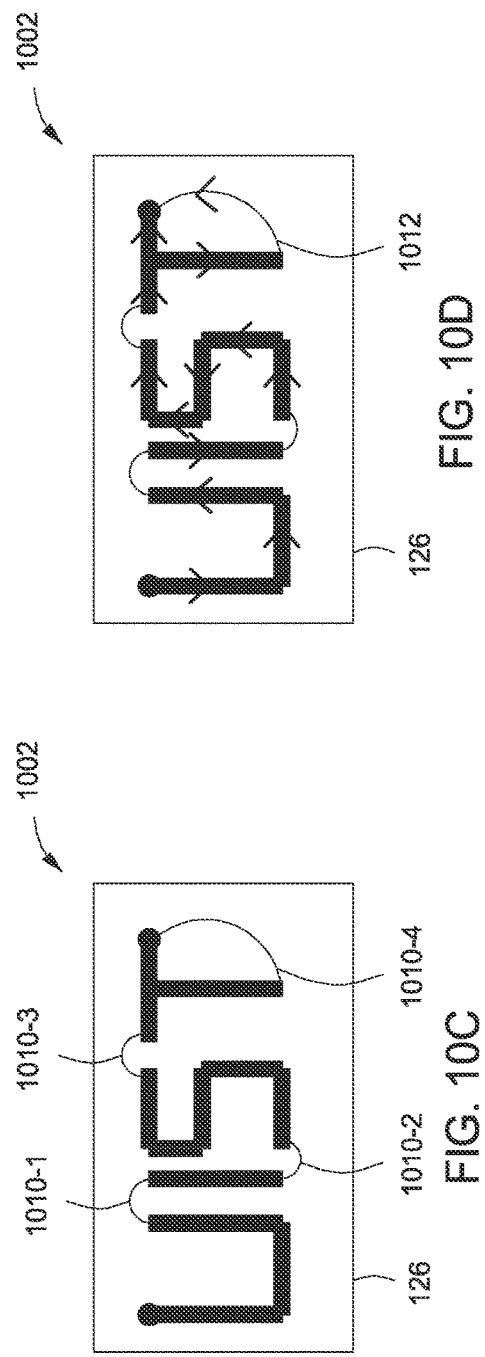
FIG. 10A  FIG. 10B  FIG. 10C  FIG. 10D

GENERATING TUBES WITHIN THREE-DIMENSIONAL MODELS

CROSS-REFERENCE TO RELATED APPLICATIONS

This application claims benefit of U.S. Provisional Patent Application filed Jun. 20, 2014 and having Ser. No. 62/014,881. The subject matter of this related application is hereby incorporated herein by reference.

BACKGROUND OF THE INVENTION

Field of the Invention

The present invention generally relates to computer graphics, and, more specifically, to generating tubes within a three-dimensional model.

Description of the Related Art

Computers are often used to generate three-dimensional (3D) models that serve as blueprints for creating physical objects. 3D printing is one technique by which physical objects are created based on computer-generated 3D models. In some cases, a 3D model includes one or more internal structures. For example, a 3D model may include cavities, indentations, or holes. Various challenges are associated with generating a 3D model that includes one or more internal structure. For instance, when generating a 3D model for 3D printing, certain types of internal structures or a certain arrangement of internal structures may compromise the structural integrity of the physical object that will be printed. Furthermore, when a 3D model includes multiple internal structures, it may be important to ensure that the structures do not interfere with each other in order to provide a fully functional and structurally sound physical object. Moreover, some types of internal structures or arrangements of internal structures may prevent an object from being printed by a 3D printer due to printing constraints.

Despite advances in computer-based 3D modeling and 3D printing technology, designing and developing internal structures within a 3D volume is a time-consuming process that often involves many design iterations. Certain types of interactive media will function only in particular physical configurations. Further, altering the internal structure of an object by creating additional structures associated with interactivity may cause the object to become unstable and easily broken.

As the foregoing illustrates, more effective techniques for generating structures within a 3D model would be useful.

SUMMARY OF THE INVENTION

One embodiment of the present invention sets forth a method for generating a tube within a three-dimensional (3D) model. The method involves receiving a first location on a surface of the 3D model. The method further involves receiving a second location on the surface of the 3D model. The method further involves receiving at least one constraint associated with a first tube to be generated within the 3D model. The method further involves generating, based on the at least one constraint, the first tube, where the first tube connects a first opening at the first location with to a second opening at the second location.

Further embodiments provide a non-transitory computer-readable medium and a computing device to carry out the method set forth above.

Advantageously, the disclosed techniques enable a user to generate a tube within the 3D model that does not compromise the structural integrity of the 3D model or interfere with other structures within the 3D model. Thus, the disclosed techniques, among other things, enable the user to efficiently create tubes within a 3D model without the need to undergo multiple iterations of creating and testing the 3D object.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 sets forth a more detailed illustration of exemplary constraints that may be processed to generate one or more tubes via the tube generator of FIG. 1, according to various embodiments of the present invention;

FIGS. 10A, 10B, 10C, and 10D illustrate a technique for generating tubes having a defined routing path within a 3D model via the tube generator of FIG. 1, according to various embodiments of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
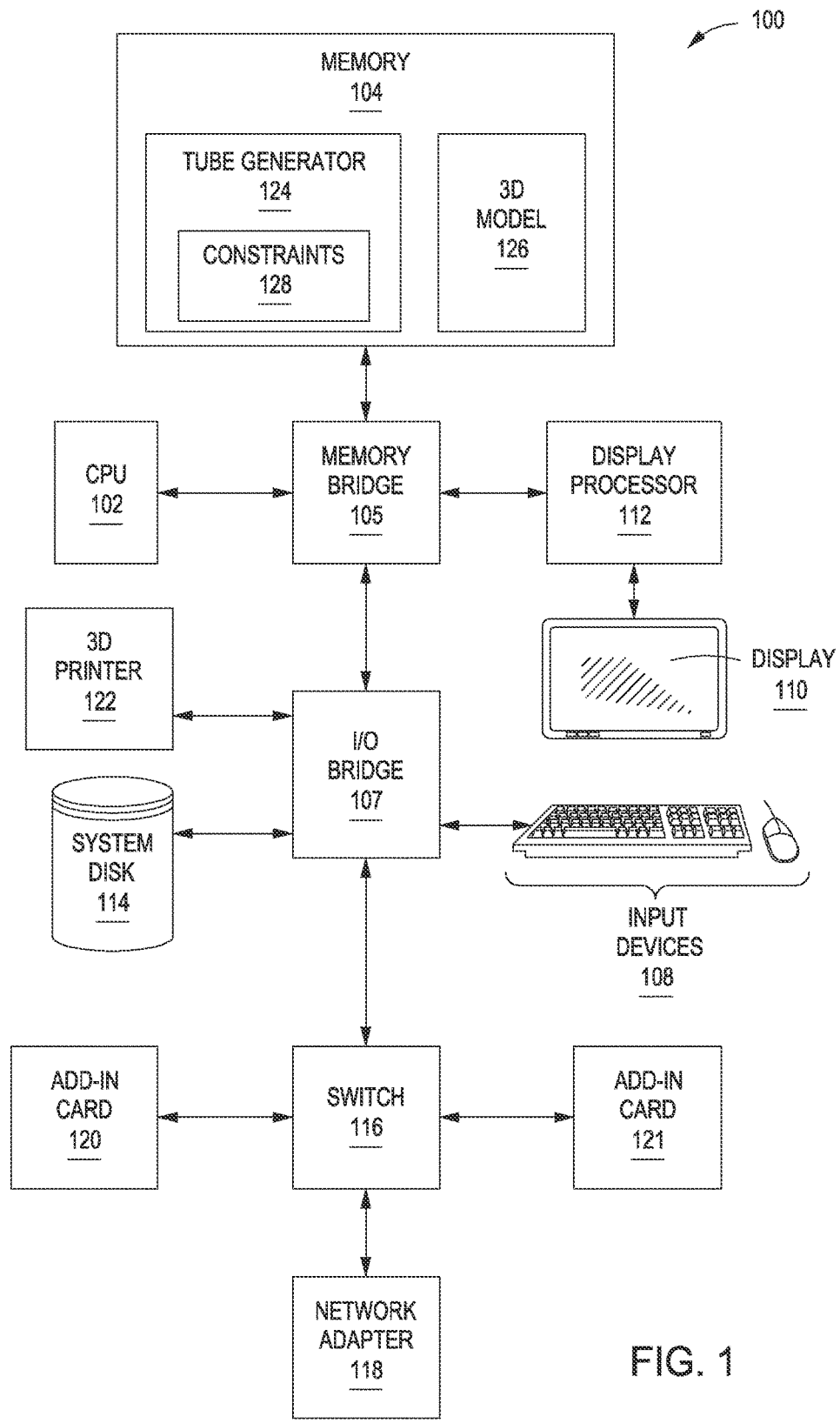
FIG. 1 illustrates a system configured to implement one or more aspects of the present invention.

FIG. 1 illustrates a system 100 configured to implement one or more aspects of the invention. System 100 may be a personal computer, video game console, personal digital assistant, mobile phone, mobile device or any other device suitable for practicing one or more embodiments of the present invention.

As shown, system 100 includes a central processing unit (CPU) 102 and a memory 104 communicating via a bus path that may include a memory bridge 105. CPU 102 includes one or more processing cores. In operation, CPU 102 is the master processor of system 100, controlling and coordinating operations of other system components. Memory 104 stores software applications and data for use by CPU 102. CPU 102 executes software applications and optionally an operating system. Memory bridge 105, which may be a Northbridge chip, is connected via a bus or other communication path (e.g., a HyperTransport link) to an I/O (input/output) bridge 107. I/O bridge 107, which may be a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link). In one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within memory 104.

Display processor 112 periodically delivers pixels to a display 110 (e.g., a screen or conventional CRT, plasma, OLED, SED, or LCD based monitor or television). Display processor 112 can provide display 110 with an analog or digital signal.

A system disk 114 is also connected to I/O bridge 107 and may be configured to store applications and data for use by CPU 102 and display processor 112. System disk 114 provides non-volatile storage and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components, such as a network adapter 118 and various add-in cards 120 and 121. Network adapter 118 allows system 100 to communicate with other systems via an electronic communications network and may include wired or wireless communication over local area networks and wide area networks, such as the Internet. Furthermore, a 3D printer 122 is connected to I/O bridge 107 and may be configured to print 3D objects based on 3D models stored in memory 104, system disk 114, or another device within the system 100.

As shown, the memory 104 includes a tube generator 124 that generates one or more tubes within the 3D model 126. In some embodiments, the tube generator 124 is capable of generating any other type of structure within and/or external to the 3D model 126, such as cavities of any size and shape, support structures, indentations, and protrusions. Furthermore, in some embodiments, the tube generator 124 generates one or more structures associated with one or more different materials.

In the example embodiment, the 3D model 126 comprises data that represents and defines a physical 3D object, including the surface of the object and the internal portions of the object. The 3D model 126 may include mathematical formulas and/or a collection of points associated with a 3D space, where points may be connected by various features such as lines, triangles, surfaces, etc. The 3D model 126 may include any other type of data capable of defining a physical 3D object. Furthermore, the 3D model 126 may be processed by the CPU 102 and/or the display processor 112 in order to render and display a graphical object on the display 110 based on the 3D model 126. In the example embodiment, the 3D model 126 may also be processed by the 3D printer 122 in order to print a 3D object.

The tube generator 124 processes constraints 128 to generate one or more tubes within the 3D model 126 based on the constraints 128. In some embodiments, the constraints 128 are specified by a user. Additionally, the constraints may include pre-defined or default values received from a software application, memory, or database associated with the tube generator 124 or the 3D model 126. The constraints 128 define how one or more tubes are generated within the 3D model 126 to modify the 3D model 126. Furthermore, the constraints 128 may include one constraint or multiple constraints. Various examples of constraints 204 are provided below.

Other components (not shown), including USB or other port connections, film recording devices, and the like, may also be connected to I/O bridge 107. For example, an audio processor may be used to generate analog or digital audio output from instructions and/or data provided by CPU 102, memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112. Pixel data can be provided to display processor 112 directly from CPU 102.

In some embodiments of the present invention, instructions and/or data representing a 3D model are provided to a render farm or a set of server computers, each similar to system 100, via network adapter 118 or system disk 114. The render farm generates one or more rendered images of the 3D model using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, memory 104 is connected to CPU 102 directly rather than through a bridge, and other devices communicate with memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

FIG. 2 sets forth a more detailed illustration of exemplary constraints 128 that may be processed to generate one or more tubes via the tube generator 124 of FIG. 1, according to various embodiments of the present invention. As shown, the constraints 128 include four different constraints for generating a tube within the 3D model 126. In other embodiments, any number of constraints 128 including any number of values may be implemented. Further, the constraints 128 may be stored in the memory 104 as individual variables with associated values, as entries in a database, or in any other form suitable for storing values and associated data. In some embodiments, constraints 128 may apply to only certain segments of a tube. For example, a constraint 206 may be associated with one or more segments of the tube such that the constraint 206 is applied to only the one or more segments, but not to other segments of the generated tube.

In the example embodiment, constraint 202-1 specifies a tube radius to be implemented by the tube generator 124 when generating a tube within the 3D model 126. As shown, the value 204-1 of the tube radius is 10 millimeters. Thus, the tube generator 124 will generate the tube with a radius of approximately 10 millimeters. In some embodiments, two or more radii may be specified for two or more portions of a tube. For example, smaller radius may be specified for one end of the tube and a larger radius may be specified for the other end of the tube, where the tube gradually widens from the smaller end to the larger end.

Constraint 202-2 specifies a minimum distance from the side of the tube to a surface to be implemented by the tube generator 124 when generating a tube within the 3D model 126. As shown, the value 204-2 of the constraint 202-2 is 30 millimeters. Thus, the side of the tube generated by the tube generator 124 will be at least 30 millimeters from the surface of the 3D model 126. In some embodiments, the constraint 202-2 applies to only a portion of the generated tube, such as a middle portion. For example, the constraint 202-2 may apply to the middle 90 percent of the tube, since portions of the tube at or near the opening may be less than 30 millimeters from the surface of the 3D model 126. In other embodiments, the constraint 202-2 applies to only portions of the tube that are located along the tube from either opening by at least a distance equal to the value 308. Thus, in the example embodiment, the constraint 202-2 would apply to only side portions of the tube that are located at least 30 millimeters along the length of the tube from either opening. In yet other embodiments, the constraint 202-2 applies to any number of user-defined or application-defined segments of the tube.

As shown, the constraint 202-3 specifies a minimum distance to another tube to be implemented by the tube generator 124 when generating a tube within the 3D model 126. The value 204-3 of the constraint 202-3 is 20 millimeters. Thus, any portion of the tube generated by the tube generator 124 will be at least 20 millimeters from any portion of another tube within the 3D model 126. In some embodiments, the constraint 202-3 applies to only a portion of the generated tube, such as a middle portion. For example, the constraint 202-3 may apply to the middle 90 percent of the tube. In other embodiments, the constraint 202-3 applies to any number of multiple pre-defined segments of the tube.

In the example embodiment, constraint 202-4 specifies a minimum angle between a path direction of a tube and a surface plane at an opening to be implemented by the tube generator 124 when generating a tube within the 3D model 126. The path direction of a tube at a particular portion may be defined as a direction in which the tube is flowing at the particular portion. In some embodiments, the path direction is represented as a line or a vector line. As shown, the value 204-4 of the constraint 202-4 is 85 degrees. Thus, the minimum angle between the path direction of the tube and a surface plane of the 3D model 126 at an opening of the tube is 85 degrees. Setting a constraint of 85 degrees will ensure that the end of each tube approaches each opening at approximately a 90 degree angle. When the angle at the end of an opening is approximately 90 degrees, there is a high amount of structural support for the tube. Moreover, it may be easier to insert media into tubes when the angle at the opening is 90 degrees. In some embodiments, the constraint 202-4 applies to only one opening of the tube. In other embodiments, a different minimum angle is specified for each opening of the tube. In various other embodiments, a constraint may specify a particular angle or a range of degrees of an angle (e.g., between 45 degrees and 90 degrees).

Other constraints that may be specified in the constraints 128 include a maximum amount of curvature of the tube, a minimum and/or a maximum radius of the tube, a minimum distance between a side of the tube and an adjacent cavity, a minimum distance between a side of the tube and another structure or material, and a minimum and/or a maximum angle between the path of the tube and a horizontal plane. For example, a tube with a steeper angle relative to the horizontal plane may be more structurally sound than a tube with shallower angles. In some embodiments, a constraint may specify that a tube is open at both ends, closed at one end, or fully enclosed (e.g., a cavity). Other constraints may specify a path of the tube, one endpoint of the tube, or both endpoints and a path of the tube. In various embodiments, any of the above constraints may apply to the entire tube or to one or more segments or portions of the tube. Furthermore, in some embodiments, after the tube generator 124 generates a tube, the tube generator 124 may generate one or more additional tubes, taking into account each previously generated tube and the constraints associated with each previously generated tube.

In various embodiments, the constraints could be dynamically determined based on the make and model of 3D printer that will be used to print the 3D model 126, the type of material that will be used to print the 3D model 126, and/or the type of media that will be inserted into tubes of the 3D model 126 post print. For example, some 3D printers may insert support structure(s) when certain angle thresholds are met. Accordingly, it may be advantageous to avoid such thresholds, for example, so that support structures do not interfere with the insertion of media into the tube(s). Additionally, because some conductive paint materials may crack when bent at certain angles, it may be advantageous to avoid such angles if it is known that such materials will be used.

In some embodiments, one or more tubes are generated in order to provide interaction or functionality in conjunction with one or more types of media that are introduced into the fabricated 3D object. For example, one or more of a gas, liquid, or solid may be introduced into tubes to implement various functions. For example, a tube with a flexible membrane, described below, may work in conjunction with a gas to mimic breathing in an animal toy. In an embodiment, one or more types of particulates are introduced into tubes. Furthermore, threadable media, such as conductive wire or luminescent wire may be introduced into tubes to provide electrical functionality or luminescence. For example, a radio may have threadable conductive wiring to various components, such as speakers and a receiver. In some embodiments, the 3D object may be printed as two separate objects to allow for easier insertion of interactive media, such as speakers and the receiver. Other embodiments may incorporate electroluminescent wire to cause the object to glow in certain areas. Moreover, as described in more detail below, various sensors may work in conjunction with the tubes to provide input and/or output functions associated with the object.

Figure 3:
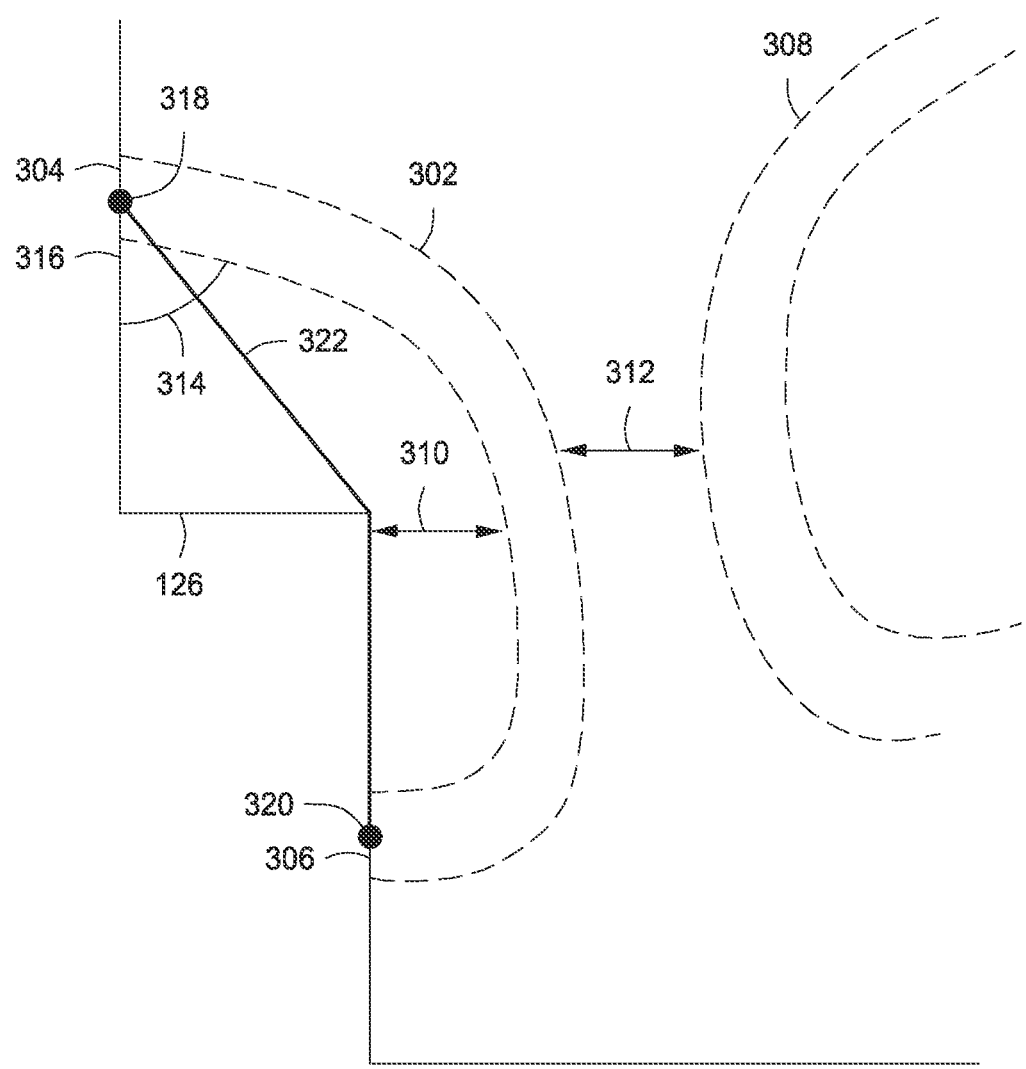
FIG. 3 illustrates a technique for generating a tube within a 3D model via the tube generator of FIG. 1, according to various embodiments of the present invention.

FIG. 3 illustrates a technique for generating a tube within a 3D model via the tube generator of FIG. 1, according to various embodiments of the present invention. As shown, the tube generator 124 generates a first tube 302 with a first opening 304 at a first location of a surface of the 3D model 126 and a second opening 306 at a second location of the surface of the 3D model 126. In some embodiments, the 3D model 126 may be displayed on the display 110 as a graphical representation of an object defined by the 3D model 126. Thus, a user may observe a graphical representation of the 3D model 126 before the 3D printer 122 prints an object based on the 3D model 126. In the example embodiment, the second tube 308 is generated in the 3D model 406 before the first tube 302 is generated.

As shown, the tube generator 124 generates the tube 302 such that the distance 310 satisfies the constraint 202-2 of FIG. 2. As such, the distance 310 between the side of the tube 302 and the surface of the 3D model 126 is at least 30 millimeters in length. Furthermore, the tube generator 124 generates the tube 302 such that the distance 312 satisfies the constraint 202-3 of FIG. 3. As such, the distance 312 between the side of the tube 302 and the surface of the second tube 308 is at least 20 millimeters in length. In some embodiments, a user may independently adjust the starting and ending radii of the first tube 302. In other embodiments, the radii of each end of the first tube 302 are specified in the constraints 128.

Moreover, the tube generator 124 generates the tube 302 such that the angle 314 at the first opening 304 satisfies the constraint 202-4 of FIG. 3. As such, the angle 314 between the path of the tube 302 and a surface plane 316 of the 3D model 126 at the first opening 304 is at least 85 degrees. In the example embodiment, the angle 314 is approximately the angle formed between the side of the tube 302 and the surface plane 316 at the first opening 304. By ensuring that the angle 314 is approximately 90 degrees or within a threshold range of 90 degrees, the tube 302 will be more structurally stable at the first opening 304 when the corresponding object is fabricated. Furthermore, insertion of media post-print may be easier when the angle is approximately 90 degrees.

In some embodiments, before generating the first tube 302, the tube generator 124 may receive a first endpoint 318 and a second endpoint 320. For example, a user may provide the first endpoint 318 and the second endpoint 320 via a software tool, such as a brush tool. The first endpoint 318 and the second endpoint 320 may be processed by the tube generator 124 to determine the locations of the first opening 304 and the second opening 306, respectively. For example, the tube generator 124 may center each opening around each endpoint.

In an exemplary embodiment, before generating the first tube 302, the tube generator 124 may generate a path 322 between the first endpoint 318 and the second endpoint 320 using a search algorithm on a voxel representation of the 3D model 126. The search algorithm may find a least-cost path through a graph of nodes given a cost function. The graph may comprise a grid of voxels as nodes with edges between adjacent nodes. The cost of the path 322 may be based on the Euclidean distance to a selected endpoint (e.g., the first endpoint 318 or the second endpoint 320). In such an embodiment, the routed path 322 is naturally constrained to stay within the surface boundaries of the 3D model 126. The search algorithm may produce the shortest path 322, but a smoother path may be required to aid with the insertion of media post-print, such as threadable wire. Moreover, the path 322 may be too close to the surface of the model 126, which may result in structural deficiencies.

Therefore, in some embodiments, the tube generator 124 executes a physical simulation by creating a virtual wire with an initial position set as the path 322. The tube generator 124 may apply constraints 128 during execution of the simulation. In an embodiment, the virtual wire may be modeled as a 3D poly-line with a bending constraint between adjacent segments. In some embodiments, the simulation is based on implementing position-based dynamics, with constraints that are modeled as penalty forces. To keep the poly-line within the 3D model 126, the tube generator 124 may compute a discretized distance field and constrain the poly-line to stay within an offset shell using a penalty force. Using the above physical simulation technique, the tube generator 124 may successfully generate tubes by routing the tubes through complex geometries, such as the geometries shown in FIGS. 7, 8, and 9. Since simulations based on position-based dynamics may not converge to a steady state, the tube generator 124 may halt the simulation after a defined number of time steps. In some embodiments, the voxel grid described above may have a resolution of 128×128×128 voxels, but the resolution may be adjusted to different values for different 3D model requirements.

Figure 4:
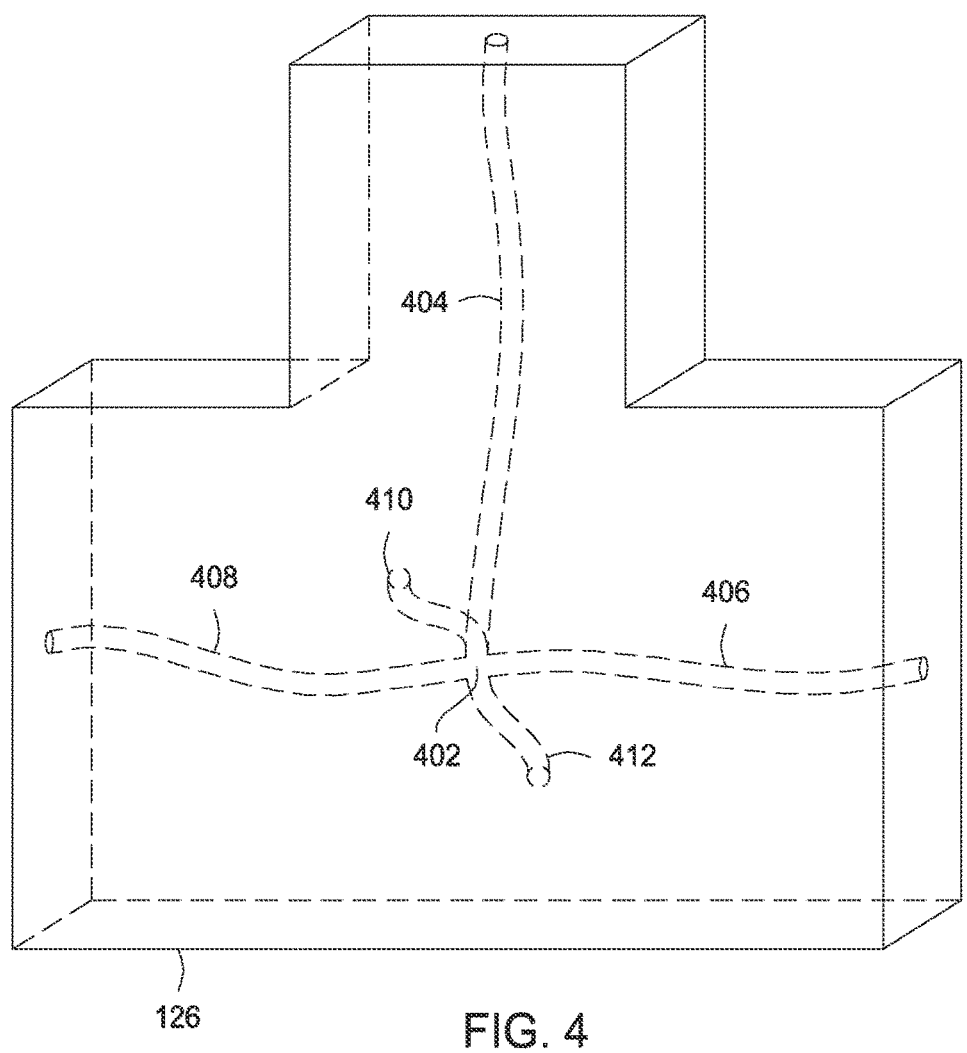
FIG. 4 illustrates a technique for generating a connection point and multiple tubes within a 3D model via the tube generator of FIG. 1, according to various embodiments of the present invention.

FIG. 4 illustrates a technique for generating a connection point and multiple tubes within a 3D model via the tube generator of FIG. 2, according to various embodiments of the present invention. As shown, the tube generator 124 receives a connection point 402 within a 3D model 126 that serves as one end of a first tube 404, a second tube 406, a third tube 408, a fourth tube 410, and a fifth tube 412. Thus, the tube generator 124 generates the first tube 404, the second tube 406, the third tube 408, the fourth tube 410, and the fifth tube 412 based on the connection point 402 and an opening on the surface of the 3D model 126 for each respective tube.

For example, a user may select x, y, and z coordinates within the 3D model 126 for the location of the connection point 402. In some embodiments, the user may select and move the connection point 402 via a mouse or other input selection device. The user may then select a location on the surface of the 3D model 126 as an endpoint or opening for a tube. For example, the user may select the top of the 3D model 126 as an endpoint for the tube 404. In response, the tube generator 124 generates the tube 404, taking into consideration any applicable constraints 128. Next, the user may select another location on the surface of the 3D model 126 as an endpoint or opening for another tube, such as the tube 406. In response, the tube generator 124 generates the tube 406, taking into consideration any applicable constraints 128. In some embodiments, the tube generator 124 processes one or more additional constraints associated with the previously generated tube 404 when generating the tube 406. Similarly, any subsequent tubes generated by the tube generator 124 may be taken into account to form additional constraints upon which generation of the additional tubes is based. Thus, a user may generate one or more tubes to create a star topology by selecting the location of the connection point 402 and different locations on the surface of the 3D model 126 as openings or endpoints for tubes.

Moreover, one or more additional constraints 128 may be applied to each tube, as described above. For example, additional constraints may be specified that are associated with the connection point 402. In some embodiments, the position of the connection point 402 may be limited to a defined volume within the 3D model 126. Therefore, a user may be limited to a certain area or volume when selecting a location for the connection point 402. In some embodiments, the position of the endpoints of one or more tubes may be limited to one or more defined areas on the surface of the 3D model 126.

As shown, the connection point 402 may be connected to tubes to create a star topology. However, in some embodiments, the tube generator 124 may generate tubes and one or more connection points to create other topologies. For example, a tree topology may be formed through the use of multiple connection points, wherein each connection point has two or more tubes branching off to other connection points in a tree-like manner. Thus, the tube generator 124 may generate a binary tree pattern or other tree patterns. To do so, the tube generator 124 may generate the connection point 402 with two or more tubes connected to the connection point 402. Instead of the two or more tubes connecting to the surface of the 3D model 126, each tube connects to one or more corresponding connection points located within the 3D model. One or more of the corresponding connection points may branch out into additional tubes. Such a pattern may be repeated any number of times to form a tree-like structure of tubes within the 3D model.

Star topologies of tubes may be useful for creating touch-sensitive objects, such as toys. For example, one terminal of each tube may be used with a corresponding sensor that implements swept-frequency capacitive sensing. However, any other sensing technologies suitable for the star topology may be implemented. Furthermore, tree structures of may be useful for allowing fluids or gases to be directed through the tubes of a printed 3D object, such as a water sprinkler. Other topologies may include two or more tubes that merge into one tube to provide a mixing function for gas, liquids, or particulates. In yet other embodiments, a tube splits into two or more other tubes to provide a splitting function for gas, liquids, or particulates. Thus, through the use of various multi-tube topologies, many forms of interactivity may be implemented through the use of various sensors associated with one or more tubes as well as movement of gases, liquids, or solids through one or more tubes.

Figure 5:
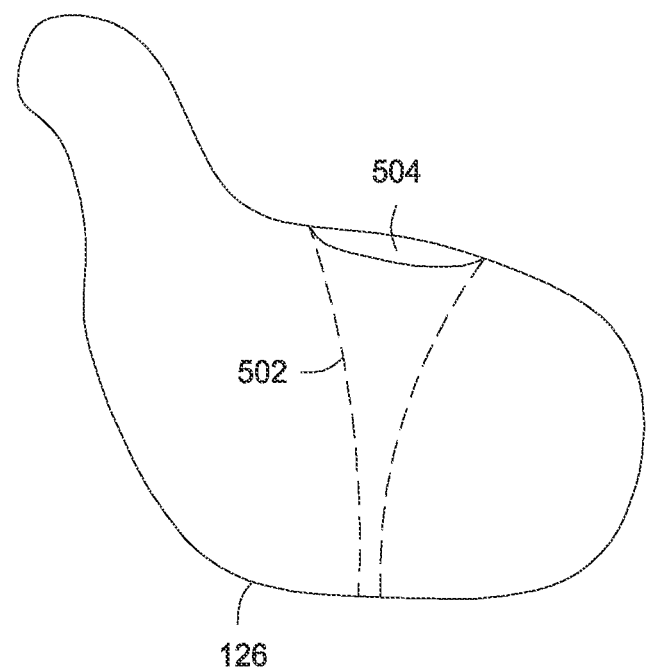
FIG. 5 illustrates a technique for generating a tube and an associated membrane within a 3D model via the tube generator of FIG. 1, according to various embodiments of the present invention.

FIG. 5 illustrates a technique for generating a tube and an associated membrane within a 3D model via the tube generator of FIG. 2, according to various embodiments of the present invention. As shown, the tube generator 124 generates a tube 502 within the 3D model 126. In the example embodiment, the tube 502 has a membrane 504 covering one opening. The membrane 504 may be a flexible membrane capable of moving inward and/or outward in response to gas pressure changes, liquid movement, or movement of particles. An example implementation would be a toy animal connected to a pump that controls gas flow through the bottom end of the tube 502 to simulate breathing by causing the membrane 504 to move outward and inward.

One or more constraints 128 may be applied when the tube generator 124 is generating the tube 602 and/or the membrane 504. For example, a thickness of the membrane may be specified. Moreover, in some embodiments, the radius of the tube 502 at various points in between the membrane 504 and the opening of the tube may be specified as constraints. A minimum and a maximum radius of the membrane 504 and the end of the tube 502 at the membrane 504 may also be specified as constraints. Furthermore, any other suitable constraints may be applied when the tube generator 124 is generating the tube 502 and/or the membrane 504. For example, a minimum distance from the side of the tube 502 to the surface of the 3D model 126 may be specified as a constraint. In some embodiments, a minimum distance from the tube 502 to another tube within the 3D model 126 may be specified as a constraint. Furthermore, a minimum angle between a path of the tube 502 and a surface plane at either opening of the tube 502 may be specified as a constraint.

Moreover, the tube generator 124 may generate one or more additional tubes and corresponding membranes within the 3D model 126. Thus, the tube generator 124 may take into account previously-generated tubes and membranes when generating new tubes and/or membranes.

Figure 6:
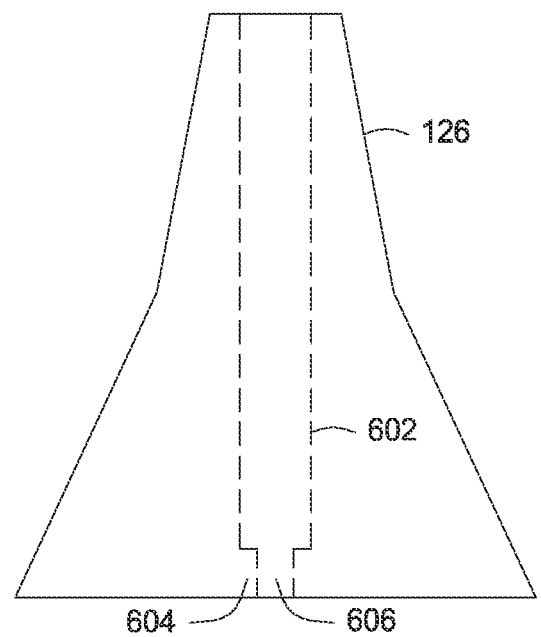
FIG. 6 illustrates a technique for generating a tube and a partial membrane within a 3D model via the tube generator of FIG. 1, according to various embodiments of the present invention.

FIG. 6 illustrates a technique for generating a tube and a partial membrane within a 3D model via the tube generator of FIG. 2, according to various embodiments of the present invention. As shown, the tube generator 124 generates a tube 602 within a 3D model 126. In the example embodiment, the tube 602 has a partial membrane 604 covering the bottom opening 606.

In some embodiments, the partial membrane 604 represents a portion of the 3D model 126. In other embodiments, the partial membrane 604 may be added post-print. Such a membrane may be useful for creating sensors, such as optic sensors or any other suitable sensor for detecting the presence and/or absence of an object. For example, if the 3D model 126 is used by the 3D printer 122 to create a pen holder, then a sensor inserted into the opening 606 may be used to detect the presence and/or absence of a pen or other object. Furthermore, in some embodiments, multiple tubes and sensors are within the 3D model 126 are capable of detecting the presence and/or absence of multiple pens, pencils, or other objects.

One or more constraints 128 may be applied when the tube generator 124 is generating the tube 602. For example, a constraint may include a thickness of the partial membrane 604. In some embodiments, a minimum and a maximum thickness of the partial membrane 604 are specified as constraints. Another constraint may include a radius of the smaller bottom opening 606 associated with the partial membrane 604. A minimum and a maximum radius of the smaller bottom opening 606 associated with the partial membrane 604 may also be specified as constraints. Furthermore, any other suitable constraints may be applied when the tube generator 124 is generating the tube 602 and/or the partial membrane 604. For example, a minimum distance from the side of the tube 602 to the surface of the 3D model 126 may be specified as a constraint. In some embodiments, a minimum distance from the tube 602 to another tube within the 3D model 126 may be specified as a constraint. Furthermore, a minimum angle between a path of the tube 602 and a surface plane at either opening of the tube 602 may be specified as a constraint.

Moreover, the tube generator 124 may generate one or more additional tubes and corresponding partial membranes within the 3D model 126. Thus, the tube generator 124 may take into account previously-generated tubes and partial membranes when generating new tubes and/or partial membranes.

Figure 7:
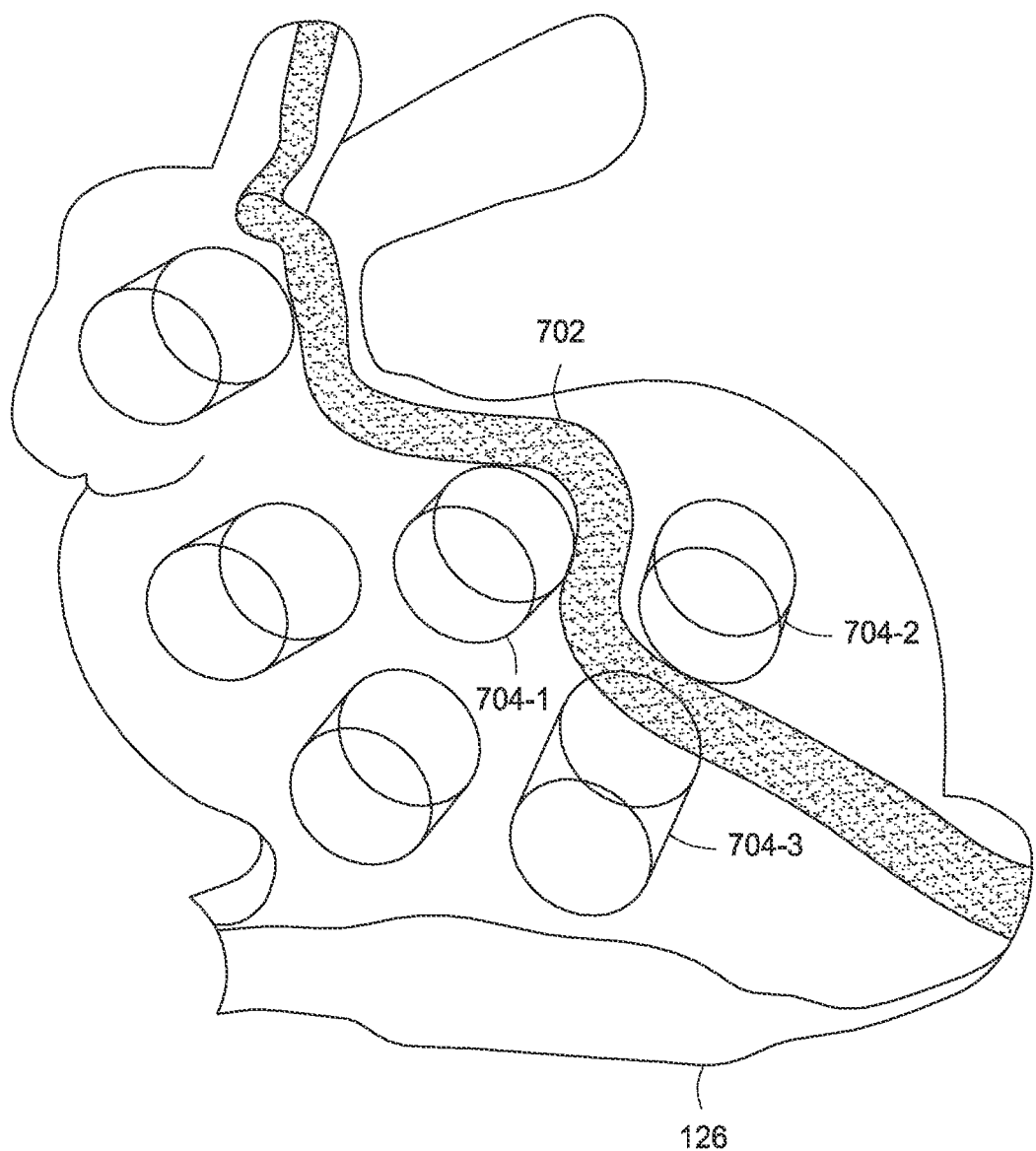
FIG. 7 illustrates a technique for generating a tube around structures within a 3D model via the tube generator of FIG. 1, according to various embodiments of the present invention.

FIG. 7 illustrates a technique for generating a tube around structures within a 3D model 126 via the tube generator 124 of FIG. 1, according to various embodiments of the present invention. In the example embodiment, by using the physical simulation technique described in conjunction with FIG. 3, the tube generator 124 may generate and route the tube 702 around holes 704-1, 704-2, 704-3 in the 3D model 126. For example, the tube generator 124 may execute a physical simulation that uses position-based dynamics to route the tube 702 above the hole 704-1 and in between the holes 704-2 and 704-3.

In some embodiments, the tube generator 124 implements various other constraints when generating the tube 702 in order to route the tube 702 within the 3D model 126. For example, a constraint 128 may specify a minimum distance to a hole to be implemented by the tube generator 124 when generating the tube 702 within the 3D model 126. Furthermore, another constraint 128 may specify a minimum distance to the surface of the model 126 to be implemented by the tube generator 124 when generating the tube 702 within the 3D model 126. In various embodiments, the tube generator 124 may implement any number of additional constraints 128 when generating the tube 702. Moreover, the tube generator 124 may include various constraints 128 as inputs for executing the physical simulation. In some embodiments, the tube generator 124 may apply various constraints 128 to the tube 702 before or after executing the physical simulation.

In some embodiments, the 3D model 126 may be displayed on the display 110 as a graphical representation of an object defined by the 3D model 126. Thus, a user may observe a graphical representation of the 3D model 126 before the 3D printer 122 prints an object based on the 3D model 126.

Figure 8:
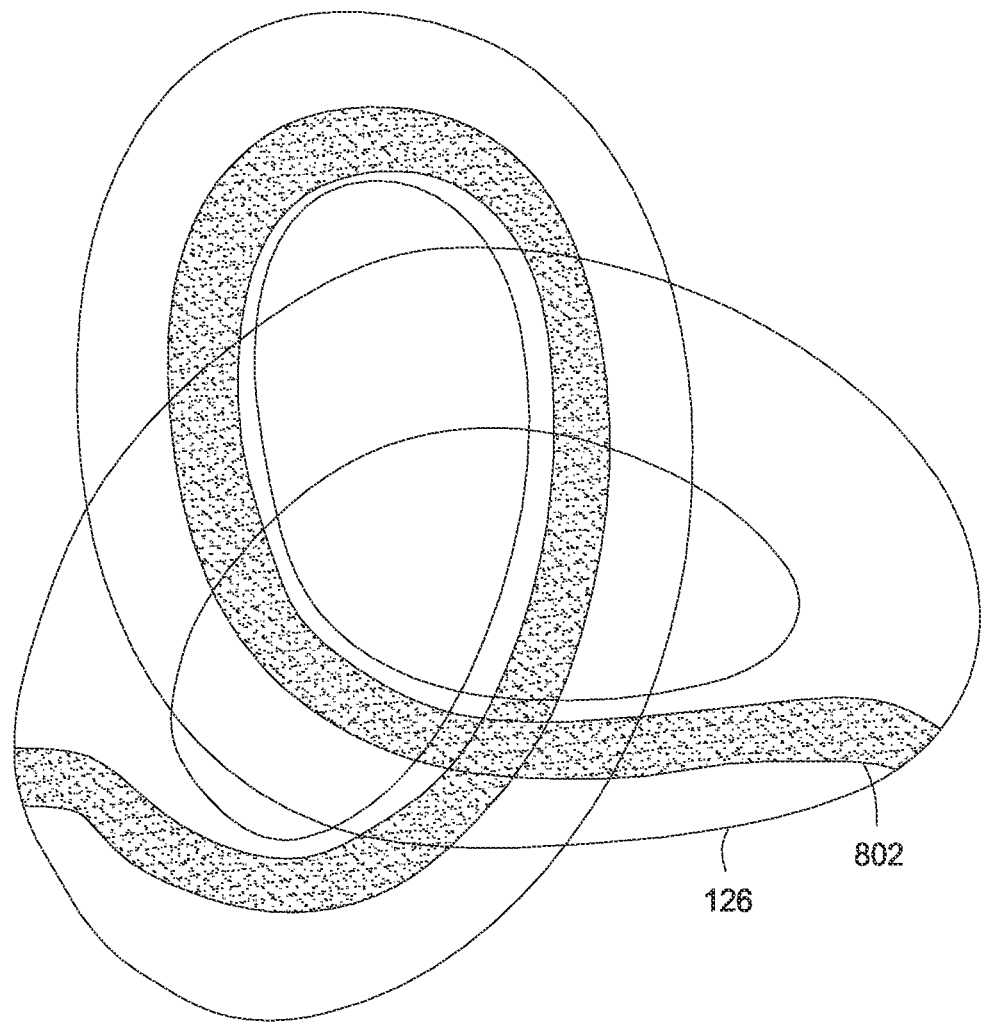
FIG. 8 illustrates a technique for generating a tube within a 3D model of a knot via the tube generator of FIG. 1, according to various embodiments of the present invention.

FIG. 8 illustrates a technique for generating a tube within a 3D model 126 of a knot via the tube generator 124 of FIG. 1, according to various embodiments of the present invention. In the example embodiment, by using the physical simulation technique described in conjunction with FIG. 3, the tube generator 124 may generate and route the tube 802 within the 3D model 126 of a knot. For example, the tube generator 124 may execute a physical simulation that uses position-based dynamics to route the tube 702 along a long and curving path within the 3D model 126 of the knot.

In some embodiments, the tube generator 124 implements various other constraints when generating the tube 802 in order to route the tube 802 within the 3D model 126. For example, a constraint 128 may specify a minimum distance to the surface of the model 126 to be implemented by the tube generator 124 when generating the tube 802 within the 3D model 126 of the knot. In various embodiments, the tube generator 124 may implement any number of constraints 128 when generating the tube 802. For example, a minimum distance from the side of the tube 802 to the surface of the 3D model 126 may be specified as a constraint. In some embodiments, a minimum distance from the tube 802 to another tube within the 3D model 126 may be specified as a constraint. Furthermore, a minimum angle between a path of the tube 802 and a surface plane at either opening of the tube 802 may be specified as a constraint. In an embodiment, the tube generator may include various constraints 128 as inputs for executing the physical simulation. In some embodiments, the tube generator 124 may apply various constraints 128 to the tube 802 before or after executing the physical simulation.

In some embodiments, the 3D model 126 may be displayed on the display 110 as a graphical representation of an object defined by the 3D model 126. Thus, a user may observe a graphical representation of the 3D model 126 before the 3D printer 122 prints an object based on the 3D model 126.

Figure 9:
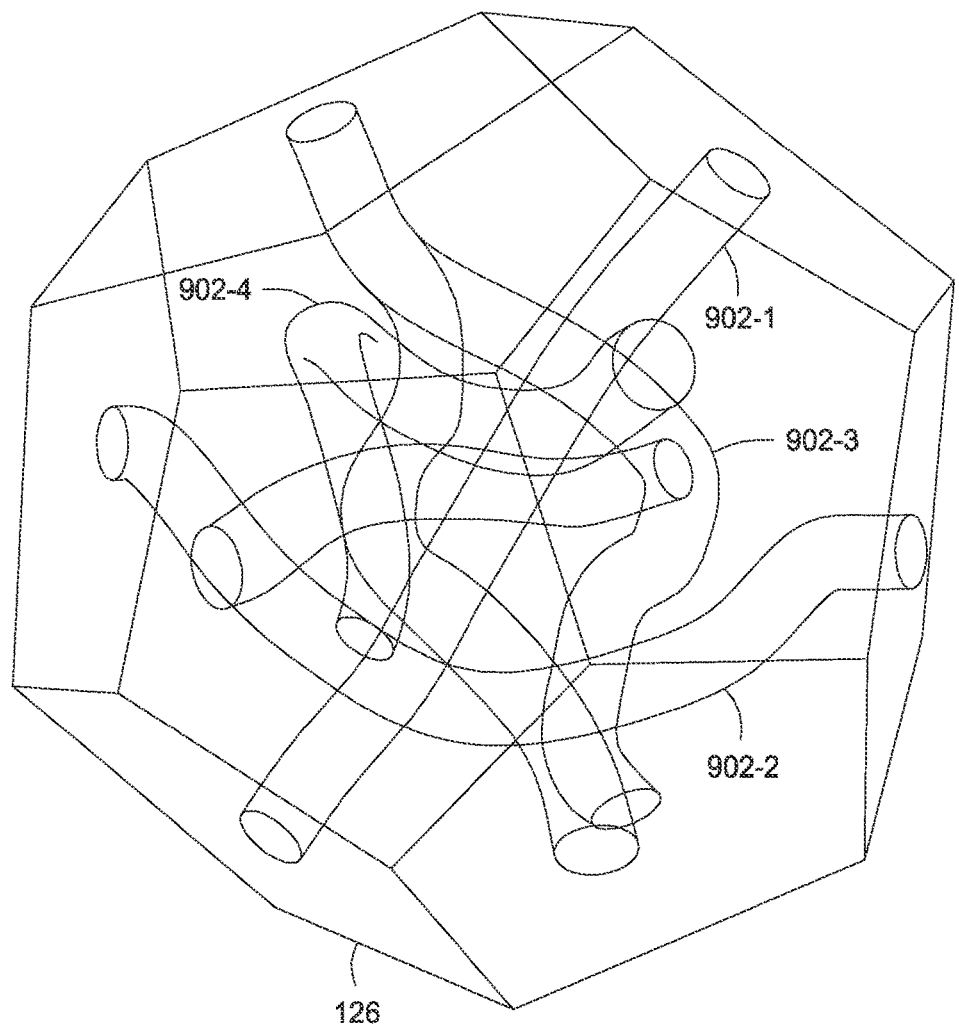
FIG. 9 illustrates a technique for serially generating tubes within a 3D model via the tube generator of FIG. 1, according to various embodiments of the present invention.

FIG. 9 illustrates a technique for generating a tubes in a tangled configuration within a 3D model via the tube generator of FIG. 1, according to various embodiments of the present invention. In the example embodiment, by using the physical simulation technique described in conjunction with FIG. 3, the tube generator 124 may generate and route multiple tubes 902-1, 902-2, 902-3, 902-4, 902-5 within the 3D model 126. For example, the tube generator 124 may execute a physical simulation that uses position-based dynamics to route each of the tubes 902-1, 902-2, 902-3, 902-4, 902-5 within the 3D model 126, such that the tubes successfully avoid each other.

In some embodiments, the tube generator 124 implements various other constraints when generating tubes in order to route the tubes 902-1, 902-2, 902-3, 902-4, 902-5 within the 3D model 126. For example, a constraint 128 may specify a minimum distance to another tube to be implemented by the tube generator 124 when generating each of the tubes 902-1, 902-2, 902-3, 902-4, 902-5 within the 3D model 126. Furthermore, another constraint 128 may specify a minimum distance to the surface of the model 126 to be implemented by the tube generator 124 when generating each of the tubes 902-1, 902-2, 902-3, 902-4, 902-5 within the 3D model 126. Furthermore, the tube generator 124 may include various constraints 128 as inputs for executing the physical simulation. In some embodiments, the tube generator 124 may apply various constraints 128 to the tubes 902-1, 902-2, 902-3, 902-4, 902-5 before or after executing the physical simulation.

In an example embodiment, the tube generator 124 generates the tubes 902-1, 902-2, 902-3, 902-4, 902-5 serially in order to prevent tube intersections. For example, after the tube generator 124 generates the tube 902-1, the volume occupied by the tube 902-1 cannot be a part of any valid routes for generating any other pipes within the model 126. Thus, after the tube generator 124 generates the tube 902-1, the tube generator 124 may add new constraints to the constraints 128 that are associated with the tube 902-1 and that are applied to any new tubes that are generated. In some embodiments, the tube generator 124 implements a penalty force associated with the tube 902-2 that prevents any new tubes from being generated within a threshold distance of the tube 902-2. The threshold distance may be added as a constraint to the constraints 128. In an embodiment, the tube generator 124 "greedily" selects the best or most efficient route when generating each subsequent pipe, based on physical simulation. In yet other embodiments, the tube generator 124 re-routes multiple tubes or globally optimizes routes of all tubes within the 3D model 126 when generating each subsequent tube, based on physical simulation.

In some embodiments, the 3D model 126 may be displayed on the display 110 as a graphical representation of an object defined by the 3D model 126. Thus, a user may observe a graphical representation of the 3D model 126 before the 3D printer 122 prints an object based on the 3D model 126.

FIGS. 10A, 10B, 10C, and 10D illustrate a technique for generating tubes of a defined shape and routing a path within a 3D model 126 via the tube generator 124 of FIG. 1, according to various embodiments of the present invention. As shown, the tube generator 124 generates tubes 1002 in the shape of letters based on a vector graphics file, such as a scalable vector graphics (SVG) file. In an embodiment, the tube generator 124 may generate the tubes 1002 based on one or more data sources other than a vector graphics file. Furthermore, in various embodiments, the tube generator 124 may generate one or more tubes 1002 that represent shapes other than letters or a combination of letters and other shapes. The tube generator 124 may receive the vector graphics file 1000 from a user, constraints 128, a database, memory, or any other suitable source.

In the example embodiment, the vector graphics file defines a start point 1004 and an end point 1006, which represent the beginning and end of a single path that passes through each segment of each of the tubes 1002. To create the single path, the tube generator 124 generates additional tubes in between the letters that connect the letters, as described in detail below. In some embodiments, the path is created in order to facilitate insertion of media post-print, such as a wire capable of emitting light. Moreover, in the example embodiment, the tube generator 124 generates a tube from the start point 1004 to an opening at a first location of the 3D model 126 and generates another tube from the end point 1006 to an opening at a second location of the 3D model 126. In the example embodiment of FIG. 10B, the vector graphics file defines points 1008-1, 1008-2, 1008-3, 1008-4, 1008-5, 1008-6, 1008-7, 1008-8 that cannot have a connection via a tube to the surface of the model 126.

In some embodiments, the tube generator 124 executes graph theory algorithms to generate a single path through the tubes 1002. In an embodiment, the single path traverses all edges of a graph defined by a user's input (e.g., the vector graphics file). To create the path, the tube generator 124 may first add a temporary edge that connects the start point 1004 and the end point 1006 to create a full Eulerian graph. In an embodiment, the temporary edge is removed at a later point in time to create a semi-Eulerian graph that can be threaded after the 3D model 126 is printed as an object. As shown in FIG. 10C, to connect disconnected subgraphs, the tube generator 124 may determine minimum Euclidean distance vertex pairs spanning two subgraphs and greedily add edges 1010-1, 1010-2, 1010-3, 1010-4 to each of the vertex pairs until all subgraphs (e.g., tubes 1002) are joined to form the single path 1012 of FIG. 10D. In some embodiments, an electro-luminescent wire or other media may be inserted into the 3D model 126 and through the single path 1012.

In an embodiment, in order for the tube generator 124 to create a full Eulerian graph, the tube generator 124 determines all odd-degree vertices in a connected graph and creates a clique of potential edges based on distance. The tube generator 124 then greedily adds edges between odd nodes until no odd nodes remain. Then, the tube generator 124 removes the temporary edge to cause the connected graph to change from a full Eulerian graph to a semi-Eulerian graph. In some embodiments, the connected semi-Eulerian graph contains all edges received as input. In various embodiments, the tube generator 124 attains lower total weight matching by connecting components and ensuring node evenness together in a global process or by using minimum-weight matching rather than greedy selection.

In example embodiments, to find a Euler tour, the tube generator 124 implements Fleury's algorithm with a modification to preserve continuity: at a given node, from multiple candidate edges, the tube generator selects edges with the smallest angular deviation from an incoming edge. Thus, the tube generator 124 may minimize turns in the final printed object, which may in turn aids in removal and assembly of support material.

Figure 11:
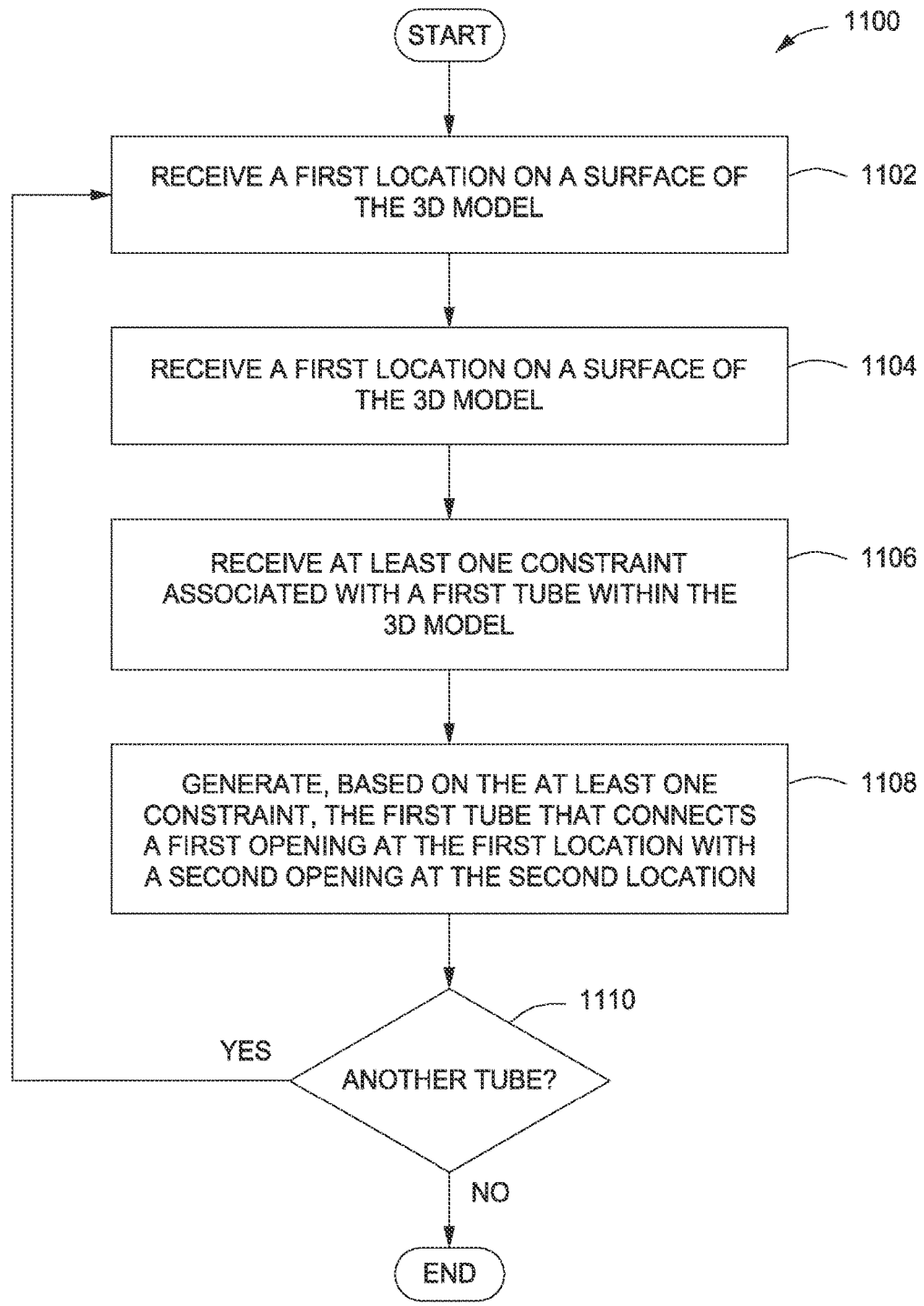
FIG. 11 is a flow diagram of method steps for generating one or more tubes within a 3D model, according to various embodiments of the present invention.

FIG. 11 is a flow diagram of method 1100 steps for generating tubes within a 3D model, according to various embodiments of the present invention. Although the method steps are described in conjunction with the system of FIG. 1, persons skilled in the art will understand that any system configured to perform the method steps, in any order, falls within the scope of the present invention.

As shown, a method 1100 begins at step 1102, where the tube generator 124 receives a first location on a surface of a 3D model. For example, a user may select a first location as an endpoint for a tube. At step 1104, the tube generator 124 receives a second location on a surface of a 3D model. For example, a user may select a second location as another endpoint for the tube.

At step 1106, the tube generator 124 receives at least one constraint associated with a first tube within the 3D model. For example, a user may select a radius of the tube and/or select any other constraint(s) described above. At step 1108, the tube generator 124 generates, based on the at least one constraint, the first tube connecting a first opening at the first location to a second opening at the second location. In some cases, the tube generator also generates a membrane or partial membrane at one or both openings of the tube, taking into account constraints associated with the membrane or partial membrane. In other cases, the tube generator 124 may generate the tube to connect two defined shapes based on a vector graphics file. Moreover, as described above, the tube generator 124 may take into account additional constraints based on previously generated tubes within the 3D model. For example, the tube generator 124 may generate the first tube to be at least a minimum distance from another tube within the 3D model.

At step 1110, the tube generator 124 determines whether there is another tube to generate. If the tube generator 124 determines that there is another tube to generate, then the method proceeds to step 1102 to begin the process of generating another tube. If the tube generator 124 determines that there is not another tube to generate, then the method ends.

In sum, a tube generator receives a first location and a second location on a surface of the 3D model in order to specify locations for generating a tube within a 3D model. The technique further involves receiving at least one constraint associated with the tube to be generated within the 3D model. Upon receiving the first location, the second location, and the at least one constraint, the tube generator generates the tube based on the at least one constraint. One or more additional tubes may then be generated within the 3D model. The tube generator may take into account additional constraints associated with other tubes within the 3D model. Additionally, the tube generator may add a membrane or partial membrane to one or both openings of a tube.

Advantageously, the disclosed techniques enable a user to generate a tube within the 3D model without compromising the structural integrity of the 3D model and without interfering with other structures within the 3D model. Thus, the disclosed techniques, among other things, enable the user to efficiently create tubes within a 3D model for fabrication as a 3D object via 3D printing or other techniques without the need to undergo multiple iterations of creating and testing the 3D object. Moreover, less time is necessary to design and fabricate structurally stable objects that are suitable for interactivity. Therefore, less time is used designing 3D models and fewer materials are necessary for creating and testing different configurations of 3D objects. By specifying endpoints for tubes and one or more constraints associated with each of the tubes, a wide variety of internal structures may be developed that may be suitable for a wide range of interactivity post-print. Accordingly, a user may efficiently design objects that are highly compatible for converting into interactive objects that may employ sensors, threaded wires, electricity, moveable membranes, and other interactive media.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of structures within 3D models, persons skilled in the art will appreciate that the systems and techniques described herein are applicable to other types of structures, topologies, and methods for object fabrication. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a tube within a three-dimensional (3D) model, the method comprising:
   receiving a first location on a surface of the 3D model;
   receiving a second location on the surface of the 3D model;
   receiving at least one constraint associated with a first tube to be generated within the 3D model, wherein the at least one constraint includes a constraint associated with a previously generated tube within the 3D model;
   determining a path within the 3D model for the first tube in accordance with the at least one constraint;
   generating the first tube along the path within the 3D model, wherein the first tube connects a first opening at the first location to a second opening at the second location; and
   causing the 3D model, including the first tube within the 3D model, to be printed via a 3D printer into a 3D object.

2. The method of claim 1, wherein the at least one constraint comprises a minimum distance between the surface of the 3D model and at least a portion of the first tube.

3. The method of claim 1, wherein the at least one constraint comprises a minimum distance between the first tube and another tube within the 3D model.

4. The method of claim 1, wherein the at least one constraint comprises a minimum angle between a direction of the path within the 3D model for the first tube at each opening and a surface plane at each respective opening.

5. The method of claim 1, wherein the at least one constraint comprises a radius of the first tube.

6. The method of claim 1, further comprising:
   receiving a third location and a fourth location on the surface of the 3D model;
   receiving at least one constraint associated with a second tube to be generated within the 3D model; and
   generating, based on the at least one constraint associated with the second tube, the second tube, wherein the second tube connects a third opening at the third location to a fourth opening at the fourth location.

7. The method of claim 1, further comprising:
   receiving a location of a connection point within the 3D model;
   receiving a third location on the surface of the 3D model;
   receiving at least one constraint associated with a second tube to be generated within the 3D model; and
   generating, based on the at least one constraint associated with the second tube, the second tube, wherein the second tube connects the connection point to a third opening at the third location.

8. The method of claim 1, wherein the at least one constraint comprises a thickness of a membrane, and further comprising generating a membrane over the first opening based on the at least one constraint.

9. The method of claim 1, wherein the at least one constraint comprises a plurality of constraints, each of the plurality of constraints associated with a different previously generated tube within the 3D model.

10. One or more non-transitory computer-readable storage media including instructions that, when executed by one or more processing units, cause the one or more processing units to generating a tube within a three-dimensional (3D) model, by performing the steps of:
    receiving a first location on a surface of the 3D model;
    receiving a second location on the surface of the 3D model;
    receiving at least one constraint associated with a first tube to be generated within the 3D model, wherein the at least one constraint includes a constraint associated with a previously generated tube within the 3D model;
    determining a path within the 3D model for the first tube in accordance with the at least one constraint;
    generating the first tube along the path within the 3D model, wherein the first tube connects a first opening at the first location to a second opening at the second location; and
    causing the 3D model, including the first tube within the 3D model, to be printed via a 3D printer into a 3D object.

11. The one or more non-transitory computer-readable storage media of claim 10, wherein the at least one constraint comprises a minimum distance between the surface of the 3D model and at least a portion of the first tube.

12. The one or more non-transitory computer-readable storage media of claim 10, wherein the at least one constraint comprises a minimum distance between the first tube and another tube within the 3D model.

13. The one or more non-transitory computer-readable storage media of claim 10, wherein the at least one constraint comprises a minimum angle between a direction of the path within the 3D model for the first tube at each opening and a surface plane at each respective opening.

14. The one or more non-transitory computer-readable storage media of claim 10, wherein the at least one constraint comprises a radius of the first tube.

15. The one or more non-transitory computer-readable storage media of claim 10, further comprising:
    receiving a third location and a fourth location on the surface of the 3D model;
    receiving at least one constraint associated with a second tube to be generated within the 3D model; and
    generating, based on the at least one constraint associated with the second tube, the second tube, wherein the second tube connects a third opening at the third location to a fourth opening at the fourth location.

16. The one or more non-transitory computer-readable storage media of claim 10, further comprising:
    receiving a location of a connection point within the 3D model;
    receiving a third location on the surface of the 3D model;
    receiving at least one constraint associated with a second tube to be generated within the 3D model; and
    generating, based on the at least one constraint associated with the second tube, the second tube, wherein the second tube connects the connection point to a third opening at the third location.

17. The one or more non-transitory computer-readable storage media of claim 10, wherein the at least one constraint comprises a thickness of a membrane, and further comprising generating a membrane over the first opening based on the at least one constraint.

18. The one or more non-transitory computer-readable storage media of claim 17, wherein the at least one constraint comprises a plurality of constraints, each of the plurality of constraints associated with a different previously generated tube within the 3D model.

19. A computing device, comprising:
a memory storing a tube generator; and
a processor coupled to the memory, wherein, when executed by the processor, the tube generator configures the processor to:
  receive a first location on a surface of a three-dimensional (3D) model;
  receive a second location on the surface of the 3D model;
  receive at least one constraint associated with a first tube to be generated within the 3D model, wherein the at least one constraint includes a constraint associated with a previously generated tube within the 3D model;
  determine a path within the 3D model for the first tube in accordance with the at least one constraint;
  generate the first tube along the path within the 3D model, wherein the first tube connects a first opening at the first location to a second opening at the second location; and
  cause the 3D model, including the first tube within the 3D model, to be printed via a 3D printer into a 3D object.

20. The computing device of claim 19, wherein the at least one constraint comprises a minimum distance between the surface of the 3D model and at least a portion of the first tube.

* * * * *

UNITED STATES PATENT AND TRADEMARK OFFICE
CERTIFICATE OF CORRECTION

PATENT NO. : 10,354,018 B2
APPLICATION NO. : 14/744981
DATED : July 16, 2019
INVENTOR(S) : Valkyrie Savage et al.

It is certified that error appears in the above-identified patent and that said Letters Patent is hereby corrected as shown below:

On the Title Page

(56) References Cited:

Please delete "Wills, K., Brockmeyer, E., Hudson, S., and Poupyrev, I. Printed optics: 3D printing of embedded optical elements for Interactive devices. In Proc. UIST '12, 589598." and insert --Willis, K., Brockmeyer, E., Hudson, S., and Poupyrev, I. Printed optics: 3D printing of embedded optical elements for Interactive devices. In Proc. UIST '12, 589598.--;

Please delete "Wills, K. D., Xu, C., Wu, K.-J., Levin, G., and Gross, M. D. Interactive fabrication: New interfaces for digital fabrication. In Proc. TEI '11. 69-72." and insert --Willis, K. D., Xu, C., Wu, K.-J., Levin, G., and Gross, M. D. Interactive fabrication: New interfaces for digital fabrication. In Proc. TEI '11. 69-72.--;

Please delete "Mills, K. D. D., and Wilson, A. D. InfraStructs: fabricating information inside physical objects for imaging in the terahertz region. ACM Trans. Graph. 32, 4, 138:1138:10." and insert --Willis, K. D. D., and Wilson, A. D. InfraStructs: fabricating information inside physical objects for imaging in the terahertz region. ACM Trans. Graph. 32, 4, 138:1138:10.--.

Signed and Sealed this
Seventeenth Day of September, 2019

Andrei Iancu
*Director of the United States Patent and Trademark Office*